(12) United States Patent
Guan et al.

(10) Patent No.: US 9,994,074 B2
(45) Date of Patent: Jun. 12, 2018

(54) DETECTION DEVICE, DETECTION SYSTEM, AND DETECTION METHOD

(71) Applicants: Haike Guan, Kanagawa (JP); Ryosuke Kasahara, Kanagawa (JP); Tomoaki Yano, Kanagawa (JP); Naoki Kikuchi, Kanagawa (JP); Takashi Maki, Kanagawa (JP)

(72) Inventors: Haike Guan, Kanagawa (JP); Ryosuke Kasahara, Kanagawa (JP); Tomoaki Yano, Kanagawa (JP); Naoki Kikuchi, Kanagawa (JP); Takashi Maki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 243 days.

(21) Appl. No.: 14/947,403

(22) Filed: Nov. 20, 2015

(65) Prior Publication Data

US 2016/0156881 A1    Jun. 2, 2016

(30) Foreign Application Priority Data

Nov. 28, 2014 (JP) ................................ 2014-241944

(51) Int. Cl.
*B60C 9/00* (2006.01)
*G06K 9/00* (2006.01)
*H04N 7/18* (2006.01)

(52) U.S. Cl.
CPC ............ *B60C 9/00* (2013.01); *G06K 9/00825* (2013.01); *G06K 9/00845* (2013.01); *H04N 7/185* (2013.01)

(58) Field of Classification Search
CPC .. G06K 9/00; G06K 9/00825; G06K 9/00845; H04N 7/18; H04N 7/185
See application file for complete search history.

(56) References Cited

U.S. PATENT DOCUMENTS

| | | | |
|---|---|---|---|
| 2010/0033571 A1* | 2/2010 | Fujita | B60W 40/02 348/149 |
| 2013/0314548 A1 | 11/2013 | Guan et al. | |
| 2013/0322691 A1 | 12/2013 | Guan | |
| 2013/0322692 A1 | 12/2013 | Guan | |
| 2014/0098196 A1 | 4/2014 | Guan | |
| 2014/0133699 A1 | 5/2014 | Guan | |
| 2014/0254872 A1 | 9/2014 | Guan | |
| 2014/0320317 A1* | 10/2014 | Grauer | G08G 1/096716 340/907 |

(Continued)

FOREIGN PATENT DOCUMENTS

| | | |
|---|---|---|
| JP | 2014-078071 | 5/2014 |
| JP | 2014-197378 | 10/2014 |
| JP | 2014-211855 | 11/2014 |

*Primary Examiner* — Behrooz Senfi
(74) *Attorney, Agent, or Firm* — Oblon, McClelland, Maier & Neustadt, L.L.P.

(57) ABSTRACT

A detection device includes a camera, a recognition unit, and a detection unit. The camera acquires image data obtained by capturing surroundings of a vehicle. The recognition unit recognizes switching of signal indication of a traffic signal from the image data. The detection unit detects a dangerous driving degree indicating a degree of dangerous driving done by a driver of the vehicle based on acceleration data of the vehicle acquired after the signal indication is switched.

9 Claims, 11 Drawing Sheets

(56) References Cited

U.S. PATENT DOCUMENTS

2016/0373710 A1* 12/2016 Kawasaki ............... H04N 9/68
2017/0098132 A1*  4/2017 Yokota ............... G06K 9/00805
2017/0120821 A1*  5/2017 Guan ................... G06K 9/4652

* cited by examiner

| DURATION TIME t | 1 s | 2 s | 3 s | 4 s | 5 s or longer |
|---|---|---|---|---|---|
| DANGEROUS DRIVING DEGREE | 4 | 3 | 2 | 1 | 0 |

DETECTION DEVICE, DETECTION SYSTEM, AND DETECTION METHOD

CROSS-REFERENCE TO RELATED APPLICATIONS

The present application claims priority to and incorporates by reference the entire contents of Japanese Patent Application No. 2014-241944 filed in Japan on Nov. 28, 2014.

BACKGROUND OF THE INVENTION

1. Field of the Invention

The present invention relates to detection devices, detection systems, and detection methods.

2. Description of the Related Art

Technology for assisting a driver and storing an image(s) in the event of an accident by utilizing a vehicular camera is conventionally known. Examples of such a driver assist technology utilizing a vehicular camera include an automatic braking function of avoiding an obstacle or reducing impact at collision with an obstacle, and an alert function providing a warning to maintain a distance from a vehicle ahead and the like.

Japanese Laid-open Patent Application No. 2014-78071 discloses a technique of controlling whether or not to store an image(s) captured by a camera mounted on a vehicle in a driving recorder depending on an acceleration of the vehicle detected by an acceleration sensor.

However, the conventional technique is disadvantageous in that it is difficult to detect dangerous driving done by a driver when signal indication of a traffic signal is switched.

Therefore, there is a need for a detection device, a detection system, and a detection method capable of detecting dangerous driving done by a driver when signal indication of a traffic signal is switched.

SUMMARY OF THE INVENTION

It is an object of the present invention to at least partially solve the problems in the conventional technology.

According to an embodiment, a detection device includes a camera, a recognition unit, and a detection unit. The camera acquires image data obtained by capturing surroundings of a vehicle. The recognition unit recognizes switching of signal indication of a traffic signal from the image data. The detection unit detects a dangerous driving degree indicating a degree of dangerous driving done by a driver of the vehicle based on acceleration data of the vehicle acquired after the signal indication is switched.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

First Embodiment

Figure 1:
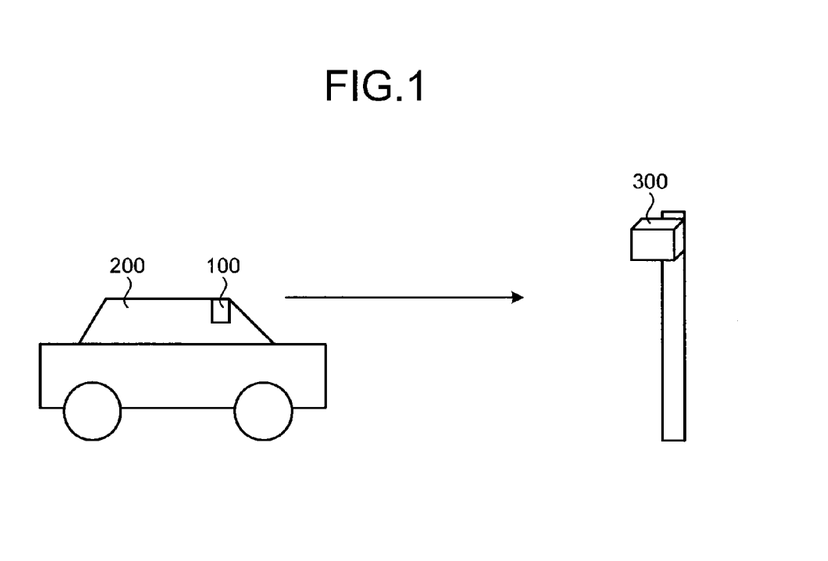
FIG. 1 is a diagram illustrating an example of a vehicle with a detection device of a first embodiment mounted thereon.

FIG. 1 is a diagram illustrating an example of a vehicle 200 with a detection device 100 according to a first embodiment mounted thereon. The detection device 100 of the first embodiment is installed to a windshield of the vehicle 200 at a position near a rear-view mirror. The detection device 100 of the first embodiment detects dangerous driving done by a driver when signal indication of a traffic signal 300 is switched.

Figure 2:
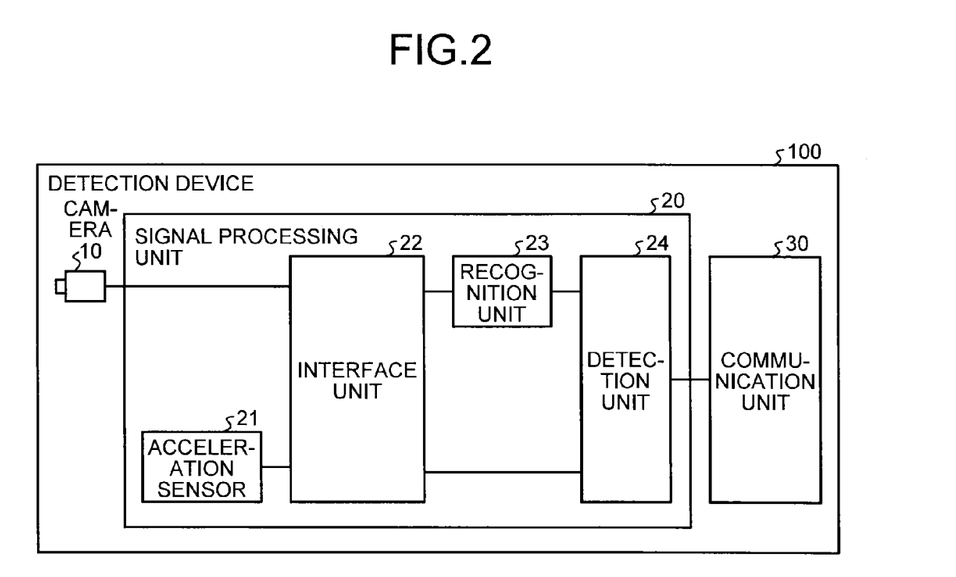
FIG. 2 is a diagram illustrating an example of a configuration of the detection device of the first embodiment.

FIG. 2 is a diagram illustrating an example of a configuration of the detection device 100 of the first embodiment. The detection device 100 of the first embodiment includes a camera 10, a signal processing unit 20, and a communication unit 30. The signal processing unit 20 includes an acceleration sensor 21, an interface unit 22, a recognition unit 23, and a detection unit 24.

The camera 10 acquires color image data by capturing the surroundings of the vehicle 200. The camera 10 feeds the image data to the interface unit 22.

The acceleration sensor 21 acquires acceleration data of the vehicle 200 and feeds the acceleration data to the interface unit 22.

Upon receiving the image data from the camera 10, the interface unit 22 converts the image data into a data format acceptable by the recognition unit 23 as consecutive time-series image frames. The interface unit 22 feeds the image data having undergone the data-format conversion to the recognition unit 23. Upon receiving the acceleration data from the acceleration sensor 21, the interface unit 22 converts the acceleration data into a data format acceptable by the detection unit 24. The interface unit 22 feeds the acceleration data having undergone the data-format conversion to the detection unit 24.

Upon receiving the image data from the interface unit 22, the recognition unit 23 recognizes switching of signal indication of the traffic signal 300 from the image data.

Figure 3:
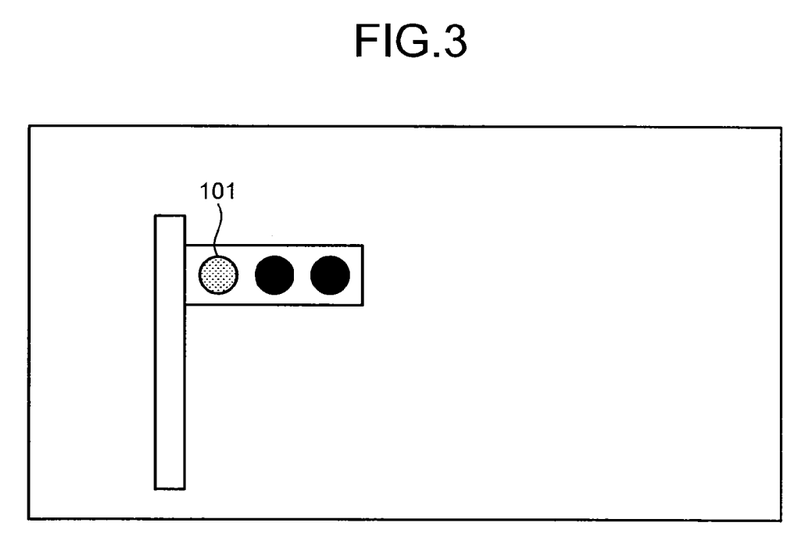
FIG. 3 is a diagram illustrating an example of image data obtained by capturing a traffic signal.

FIG. 3 is a diagram illustrating an example of image data obtained by capturing the traffic signal 300. The example illustrated in FIG. 3 is an example of image data captured in a situation where signal indication of the traffic signal 300 is green (hereinafter, "green signal") and therefore contains a region 101 representing the green signal of the traffic signal 300. The recognition unit 23 recognizes switching of signal indication of the traffic signal 300 by performing a process of recognizing signal indication (hereinafter, "signal recognition process"), which will be described later.

Referring back to FIG. 2, the signal recognition process, by which the recognition unit 23 recognizes switching of signal indication of the traffic signal 300, is described in detail below. The recognition unit 23 converts the image data in the (R,G,B) color space into image data in the (Y,U,V) color space using Equation (1) below.

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & 0.100 \end{bmatrix} \begin{bmatrix} R \\ G \\ B \end{bmatrix} \quad (1)$$

Thereafter, the recognition unit 23 performs an extraction process of extracting a signal pixel region representing signal indication from the image data in the (Y,U,V) color space based on (U,V) distributions of red signal pixels, green signal pixels, and yellow signal pixels and the image data in the (Y,U,V) color space. An example of (U,V) distribution of the red signal pixels, that of the green signal pixels, and that of the yellow signal pixels are respectively described below.

Figure 4:
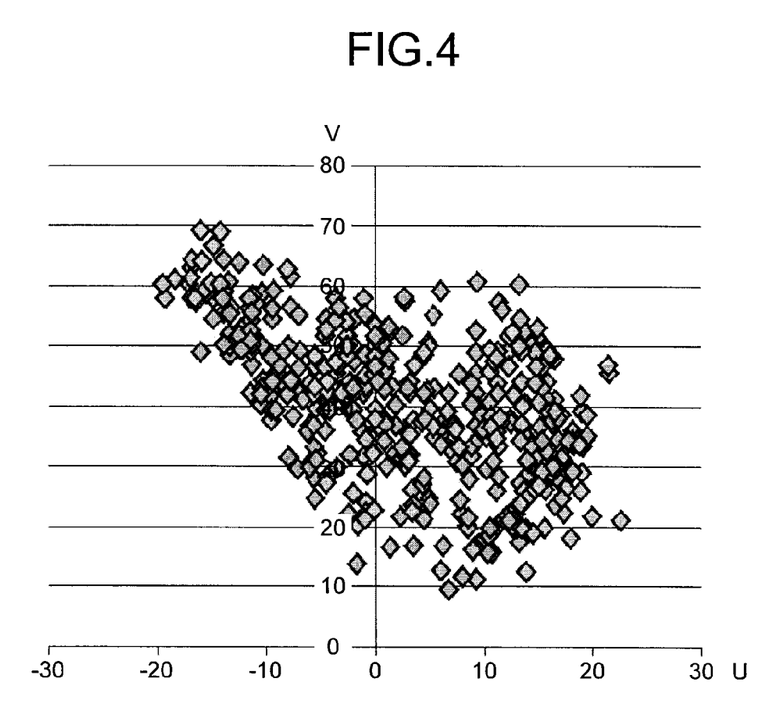
FIG. 4 is a diagram illustrating an example of (U,V) distribution of red signal pixels.

FIG. 4 is a diagram illustrating an example of (U,V) distribution of red signal pixels. More specifically, FIG. 4 illustrates an example of (U,V) distribution of red signal pixels obtained from image data in the (R,G,B) color space of a plurality of image samples, in each of which a red signal is captured.

Figure 5:
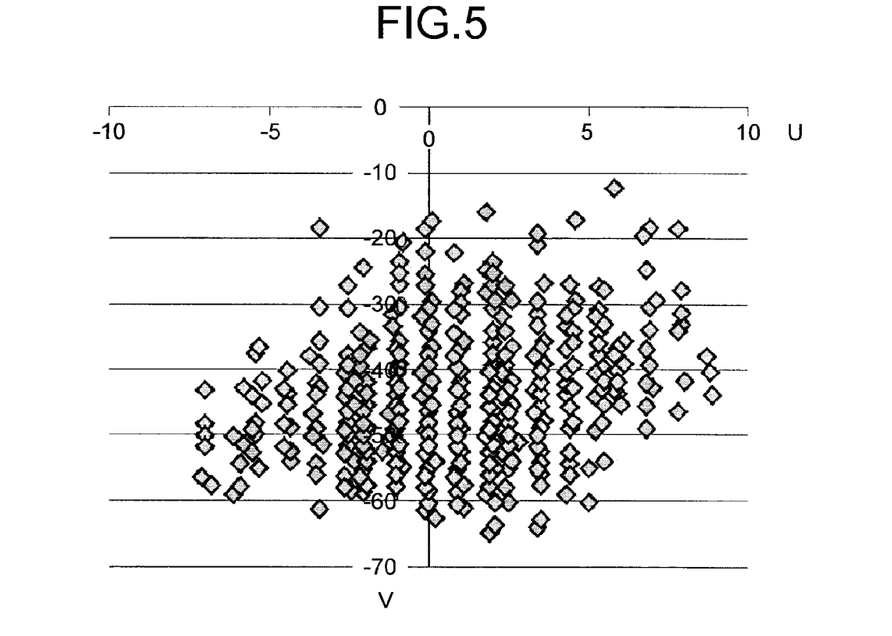
FIG. 5 is a diagram illustrating an example of (U,V) distribution of green signal pixels.

FIG. 5 is a diagram illustrating an example of (U,V) distribution of green signal pixels. More specifically, FIG. 5 illustrates an example of (U,V) distribution of green signal pixels obtained from image data in the (R,G,B) color space of a plurality of image samples, in each of which a green signal is captured.

Figure 6:
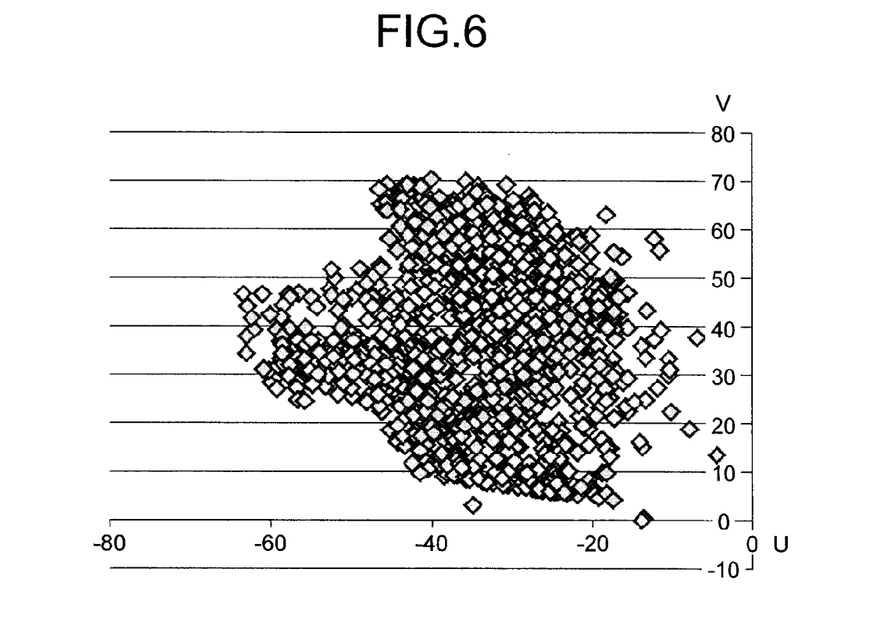
FIG. 6 is a diagram illustrating an example of (U,V) distribution of yellow signal pixels.

FIG. 6 is a diagram illustrating an example of (U,V) distribution of yellow signal pixels. More specifically, FIG. 6 illustrates an example of (U,V) distribution of yellow signal pixels obtained from image data in the (R,G,B) color space of a plurality of image samples, in each of which a yellow signal is captured.

Referring back to FIG. 2, more specifically, the recognition unit 23 determines whether or not (U,V) values of the image data in the (Y,U,V) color space fall within a range of predetermined thresholds for U (U-min and U-max) and predetermined thresholds for V (V-min and V-max) for each of the (U,V) distributions illustrated in FIGS. 4 to 6. Thereafter, the recognition unit 23 extracts, from the image data in the (Y,U,V) color space, pixels within the threshold range as a signal pixel region.

Specific values of the thresholds for U (U-min and U-max) and the thresholds for V (V-min and V-max) may be determined as desired. However, if the threshold range is excessively large, possibility that a pixel not representing signal indication is falsely detected increases. Accordingly, the thresholds are to be set not to cover (U,V) values of a pixel not representing signal indication.

Figure 7:
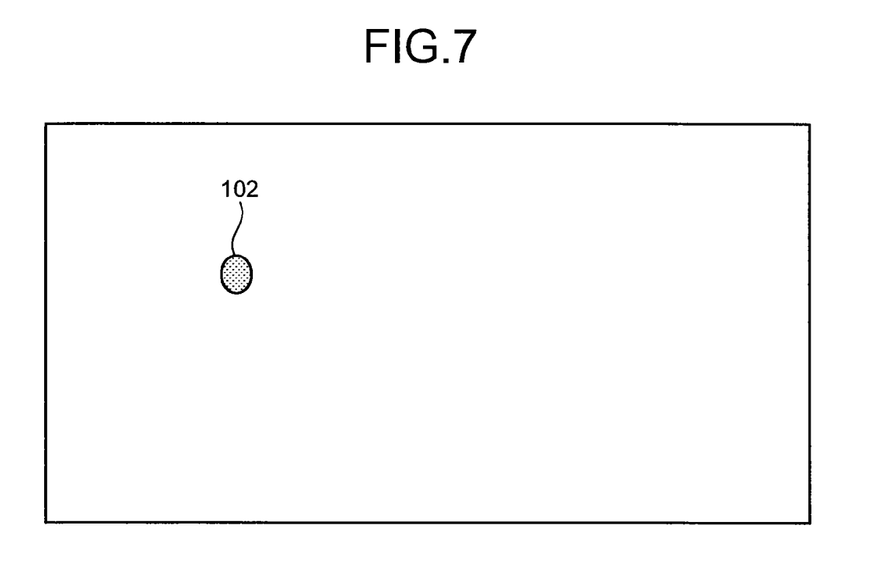
FIG. 7 is a diagram illustrating an example of a green-signal pixel region extracted by a recognition unit of the first embodiment.

FIG. 7 is a diagram illustrating an example of a green-signal pixel region 102 extracted by the recognition unit 23 of the first embodiment. The green-signal pixel region 102 illustrated in FIG. 7 is smaller in size than the region 101 representing the actual green signal. More specifically, FIG. 7 illustrates an example, in which a region that should be extracted as a green-signal region is not extracted as green signal pixels due to influence of noise pixels. The noise pixels may include any one of noise pixels produced by the environment where the image is captured, noise pixels resulting from characteristics of an imaging device, and noise pixels produced by dusts sticking to the surface of the imaging device. The noise pixels produced by the environment where the image is captured are, more specifically, pixels in a green-signal region, from which light, e.g., sunlight, is reflected when the image of the traffic signal 300 is captured by the camera 10. The noise pixels resulting from characteristics of an imaging device are, more specifically, pixels influenced by random noise, for example.

Referring back to FIG. 2, the recognition unit 23 performs an expansion process of expanding the signal pixel region. More specifically, the recognition unit 23 expands the signal pixel region into an expanded pixel region by covering each pixel in the signal pixel region with a plurality of pixels. The recognition unit 23 may cover each pixel with, for example, an n×n (n is an integer greater than 0) pixel block. For example, if n=7 is given, the recognition unit 23 expands each pixel in the signal pixel region into an expanded pixel region additionally including 48 (=7×7−1) pixels surrounding the pixel.

Figure 8:
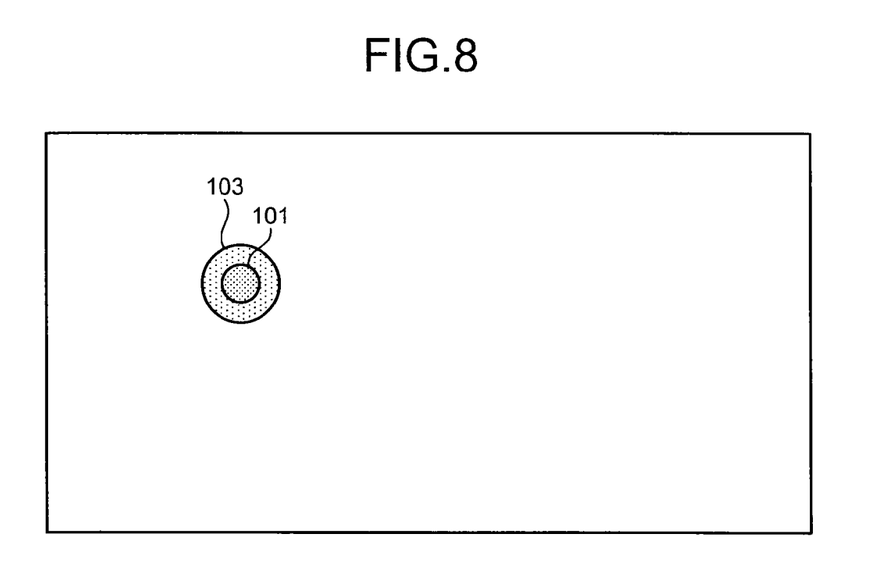
FIG. 8 is a diagram illustrating an example of an expanded pixel region obtained by the recognition unit of the first embodiment.

FIG. 8 is a diagram illustrating an example of an expanded pixel region 103 obtained by the recognition unit 23 of the first embodiment. More specifically, FIG. 8 illustrates an example, in which the expanded pixel region 103 containing the region 101 representing the green signal, is obtained by performing the expansion process on the extracted green-signal pixel region 102.

Referring back to FIG. 2, the recognition unit 23 performs a shape recognition process of recognizing the shape of the region representing signal indication. More specifically, the recognition unit 23 applies Hough transform to the extracted signal pixel region, thereby determining whether or not a circular pixel region can be extracted from the expanded pixel region. If a circular pixel region can be extracted, the recognition unit 23 recognizes that the circular pixel region is a region representing signal indication of the traffic signal 300. The recognition unit 23 calculates a rectangular region circumscribing the circular pixel region and generates recognition data indicating the rectangular region as a recognition result region.

Figure 9:
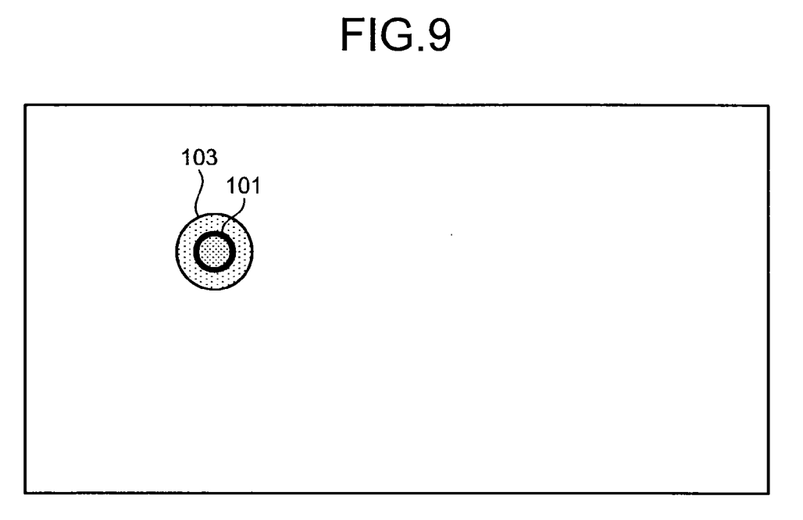
FIG. 9 is a diagram illustrating an example of a circular pixel region extracted by Hough transform performed by the recognition unit of the first embodiment.

FIG. 9 is a diagram illustrating an example of the circular pixel region extracted by Hough transform by the recognition unit 23 of the first embodiment. More specifically, FIG. 9 illustrates an example, in which the region 101 representing a green signal is extracted as the circular pixel region by applying Hough transform to the green-signal pixel region 102 (see FIG. 7).

Figure 10:
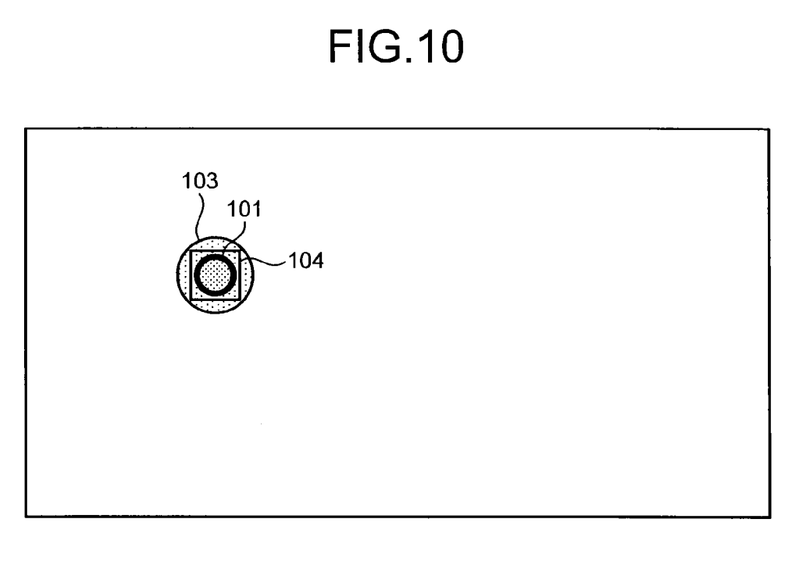
FIG. 10 is a diagram illustrating an example of a recognition result region obtained by the recognition unit of the first embodiment.

FIG. 10 is a diagram illustrating an example of a recognition result region 104 obtained by the recognition unit 23 of the first embodiment. More specifically, FIG. 10 illustrates an example, in which the recognition result region 104 is recognized as a rectangle circumscribing the region 101 representing the green signal extracted as the circular pixel region.

Figure 11:
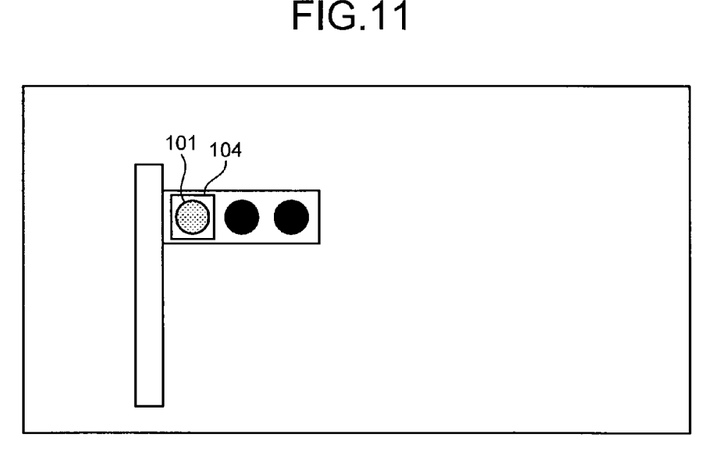
FIG. 11 is a diagram illustrating an example of a recognition result region recognized by the recognition unit of the first embodiment.

FIG. 11 is a diagram illustrating an example of a recognition result region 104 recognized by the recognition unit 23 of the first embodiment. More specifically, FIG. 11 illustrates an example, in which the green signal of the traffic signal 300 included in the image data illustrated in FIG. 3 is recognized as the recognition result region 104 containing the region 101 representing the green signal.

Referring back to FIG. 2, the recognition unit 23 performs a determination process of determining whether or not switching of signal indication of the traffic signal 300 can be recognized from a plurality of pieces of recognition data obtained by generating the recognition data described above in a time series manner. If the recognition unit 23 recognizes that signal indication is switched, the recognition unit 23 feeds a request for starting a dangerous-driving detection process to the detection unit 24.

The detection unit 24 receives the request for starting the detection process from the recognition unit 23 and receives acceleration data from the interface unit 22. Upon receiving the request for starting the detection process from the recognition unit 23, the detection unit 24 detects dangerous driving done by a driver of the vehicle 200 based on acceleration data acquired after the signal indication is switched.

More specifically, the detection unit 24 detects dangerous driving done by the driver of the vehicle 200 based on a dangerous driving degree, which is determined depending on a duration of time between when the signal indication is switched and when acceleration exceeds a first threshold. An example of the dangerous driving degree is described below.

Figure 12:
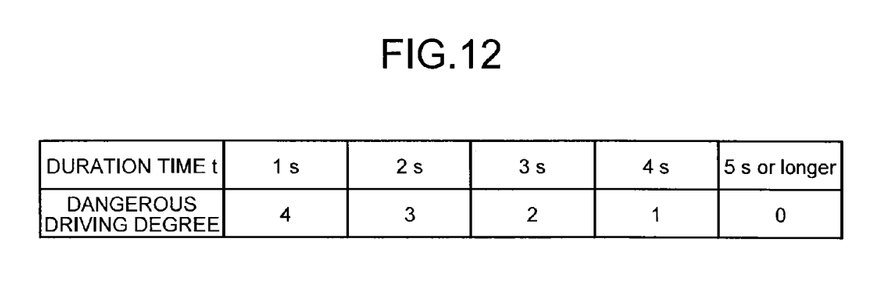
FIG. 12 is a diagram illustrating an example of a dangerous driving degree of the first embodiment.

FIG. 12 is a diagram illustrating an example of the dangerous driving degree of the first embodiment. More specifically, FIG. 12 illustrates an example of a dangerous driving degree for a situation where signal indication switches from the red signal to the green signal. Duration time t is a duration of time between when signal indication changes from red to green and when the acceleration exceeds the first threshold. The dangerous driving degree indicates a degree of danger of dangerous driving. The higher the dangerous driving degree, the more dangerous the driving. For example, when the duration time between when signal indication changes from red to green and when the acceleration exceeds the first threshold is 3 seconds, the dangerous driving degree is 2.

The dangerous driving degree may be determined as desired depending on what type of driving is judged as dangerous. For instance, when making a fast start immediately after signal indication changes from red to green, there is a possibility that a pedestrian is still walking across a crosswalk or the like. In the example illustrated in FIG. 12 where such driving is judged most dangerous, the dangerous driving degree is defined such that the shorter the duration time t, the higher the dangerous driving degree.

Referring back to FIG. 2, the detection unit 24 feeds dangerous-driving-degree information indicating the dangerous driving degree to the communication unit 30. Upon receiving the dangerous-driving-degree information from the detection unit 24, the communication unit 30 transmits detection information, in which identification information, by which a transmission source is identified, is associated with the dangerous-driving-degree information, to a server apparatus. The identification information, by which the transmission source is identified, is described below.

The transmission source may be identified on a per-the-vehicle-200 basis (per-the-detection-device-100 basis), or on a per-driver basis. In a situation where the vehicle 200 can be driven by any one of a plurality of drivers and therefore it is desired to detect dangerous driving on a per-driver basis, the following configuration may be adopted, for example. That is, before a driver drives the vehicle 200, the detection device 100 identifies the driver and transmits detection information including identification information of the driver to the server apparatus. An embodiment of a detection system including the server apparatus will be described later in a second embodiment.

The driver may be identified by any desired method. For example, driver identification may be made by inserting an ID (identification) card, by which the driver is identified, into an ID card slot provided in the detection device 100 and identifying the driver based on the inserted ID card. For another example, driver identification may be made by a reading unit provided in the detection device 100, which reads an IC (integrated circuit) card, by which the driver is identified, by utilizing a communication standard such as an NFC (near field communication).

The detection unit 24 described above may be configured to alert the driver that the driver is making dangerous driving by sound or the like if the detected dangerous driving degree is higher than a second threshold.

A detection method performed by the detection device 100 of the first embodiment is described below.

Figure 13:
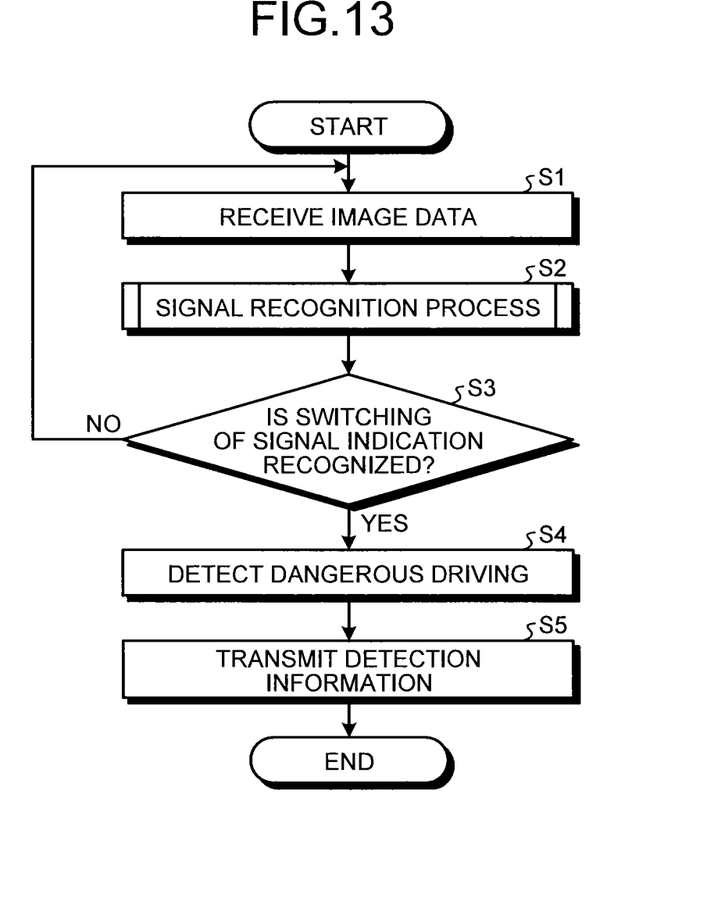
FIG. 13 is a flowchart illustrating an example of a detection method performed by the detection device of the first embodiment.

FIG. 13 is a flowchart illustrating an example of the detection method performed by the detection device 100 of the first embodiment. The recognition unit 23 receives image data acquired by the camera 10 from the interface unit 22 (S1). Thereafter, the recognition unit 23 performs the signal recognition process (S2). Details of the signal recognition process will be described later with reference to FIG. 14.

If switching of signal indication is recognized in the signal recognition process at S3 (Yes at S3), the detection unit 24 detects dangerous driving done by a driver of the vehicle 200 based on a dangerous driving degree (see FIG. 2), which is determined depending on the duration of time between when the signal indication is switched and when acceleration exceeds the first threshold (S4). If switching of signal indication is not recognized in the signal recognition process at S3 (No at S3), processing returns to S1.

Thereafter, the communication unit 30 transmits detection information, in which identification information, by which the driver is identified, is associated with dangerous-driving-degree information indicating the dangerous driving degree, to the server apparatus (S5).

The signal recognition process at S2 is described in detail below.

Figure 14:
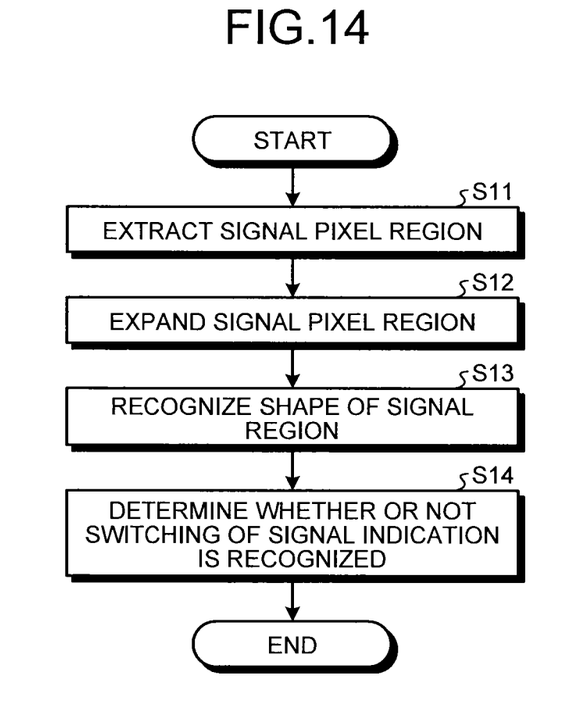
FIG. 14 is a flowchart illustrating an example of a signal recognition process performed by the detection device of the first embodiment.

FIG. 14 is a flowchart illustrating an example of the signal recognition process performed by the detection device 100 of the first embodiment. The recognition unit 23 performs the extraction process of extracting a signal pixel region representing signal indication from the image data in the (Y,U,V) color space based on the (U,V) distributions of the red signal pixels, the green signal pixels, and the yellow signal pixels and the image data in the (Y,U,V) color space first (S11).

Thereafter, the recognition unit 23 performs the expansion process, described above, of expanding the signal pixel region (S12). Thereafter, the recognition unit 23 performs the shape recognition process, described above, of recognizing the shape of a region representing signal indication (S13). Thereafter, the recognition unit 23 determines whether or not switching of signal indication of the traffic signal 300 is recognized from the plurality of pieces of recognition data, described above, obtained by the shape recognition process performed at S13 (S14).

A hardware structure of the detection device 100 of the first embodiment is described below.

A hardware structure of the camera 10 is described first.

Figure 15:
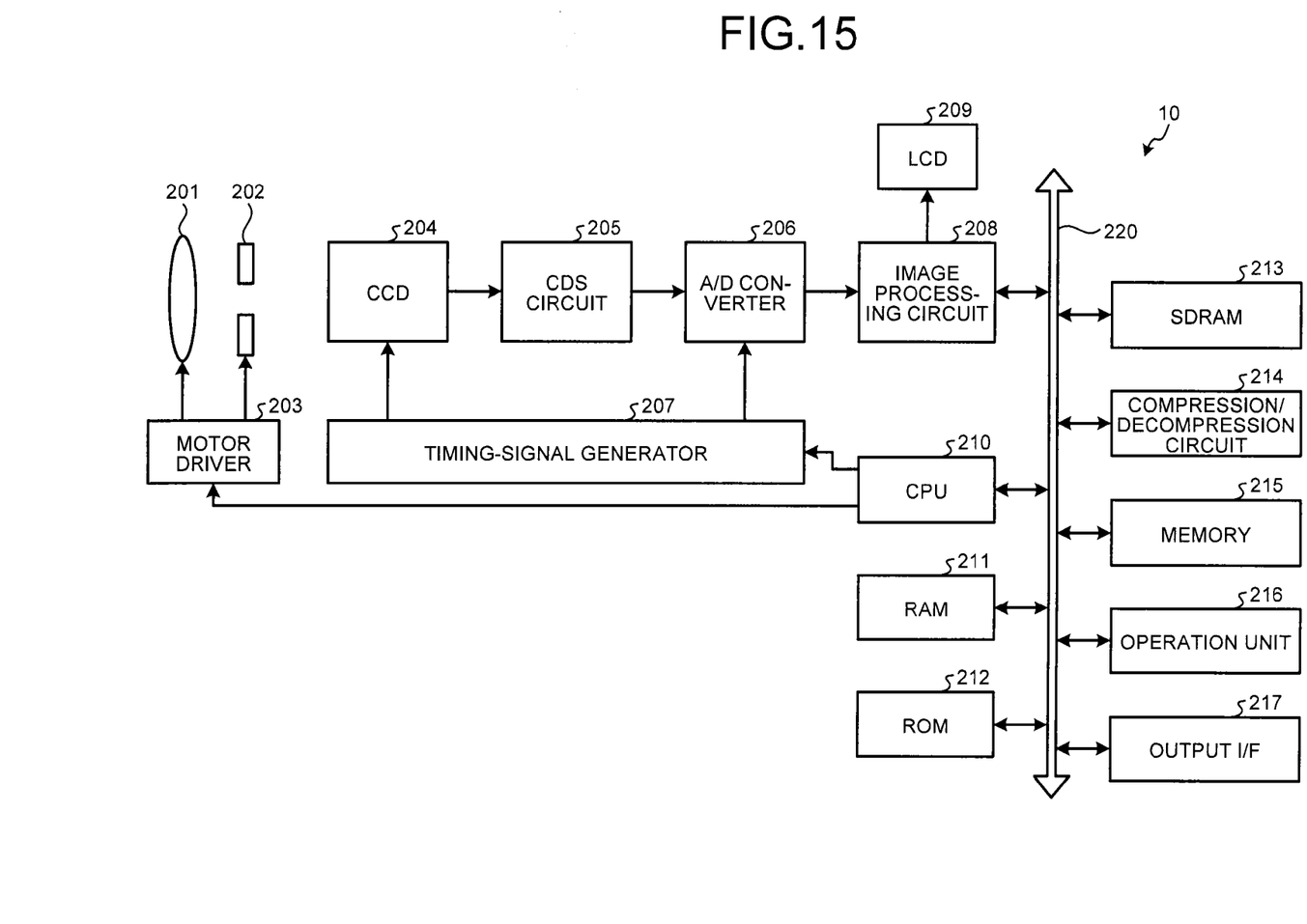
FIG. 15 is a diagram illustrating an example of a hardware structure of a camera of the first embodiment.

FIG. 15 is a diagram illustrating an example of the hardware structure of the camera 10 of the first embodiment. The camera 10 of the first embodiment includes an imaging optical system 201, a mechanical shutter 202, a motor driver 203, a CCD (charge coupled device) 204, a CDS (correlated double sampling) circuit 205, an A/D converter 206, a timing-signal generator 207, an image processing circuit 208, an LCD (liquid crystal display) 209, a CPU (central processing unit) 210, a RAM (random access memory) 211, a ROM (read only memory) 212, an SDRAM (synchronous dynamic random access memory) 213, a compression/decompression circuit 214, a memory 215, an operation unit 216, and an output I/F 217.

The image processing circuit 208, the CPU 210, the RAM 211, the ROM 212, the SDRAM 213, the compression/decompression circuit 214, the memory 215, the operation unit 216, and the output I/F 217 are connected to each other via a bus 220.

The imaging optical system 201 converges light reflected from a subject. The mechanical shutter 202 is opened a predetermined period of time, thereby causing the light converged by the imaging optical system 201 to be incident on the CCD 204. The motor driver 203 drives the imaging optical system 201 and the mechanical shutter 202.

The CCD 204 forms an image of the subject with the light incident on the CCD 204 via the mechanical shutter 202, and feeds analog image data representing the subject image to the CDS circuit 205. Upon receiving the analog image data from the CCD 204, the CDS circuit 205 removes noise components from the image data, and feeds the analog image data, from which the noise components are removed, to the A/D converter 206. Upon receiving the analog image data from the CDS circuit 205, the A/D converter 206 converts the analog image data into digital image data. The A/D converter 206 feeds the digital image data to the image processing circuit 208. The timing-signal generator 207 controls operation timing of the CCD 204, the CDS circuit 205, and the A/D converter 206 by transmitting timing signals to the CCD 204, the CDS circuit 205, and the A/D converter 206 in accordance with control signals fed from the CPU 210.

Upon receiving the digital image data from the A/D converter 206, the image processing circuit 208 performs image processing on the digital image data using the SDRAM 213. Examples of the image processing include CrCb conversion, white balancing, contrast correction, edge enhancement, and color conversion. The white balancing is image processing of adjusting color intensities of image data. The contrast correction is image processing of adjusting contrast of image data. The edge enhancement is image processing of adjusting sharpness of image data. The color conversion is image processing of adjusting hue of image data.

The image processing circuit 208 feeds image data having undergone the image processing described above to the LCD 209 or the compression/decompression circuit 214. The LCD 209 is a liquid crystal display for displaying the image data received from the image processing circuit 208.

The CPU 210 controls operations of the camera 10 by executing program instructions. The RAM 211 is a work area used by the CPU 210 in executing the program instructions and is a readable and writable storage area used to store various types of data and the like. The ROM 212 is a read-only storage area where the program instructions to be executed by the CPU 210 and the like are to be stored.

The SDRAM 213 is a storage area where image data is temporarily stored when the image processing circuit 208 performs image processing on the image data.

Upon receiving image data from the image processing circuit 208, the compression/decompression circuit 214 compresses the image data. The compression/decompression circuit 214 stores the compressed image data in the memory 215. Furthermore, upon receiving image data from the memory 215, the compression/decompression circuit 214 decompresses the image data. The compression/decompression circuit 214 temporarily stores the decompressed image data in the SDRAM 213. The memory 215 temporarily stores therein the compressed image data.

The operation unit 216 accepts an operation from a user of the camera 10. For example, the operation unit 216 accepts an operation of storing image data displayed on the LCD 209 in the memory 215. The output I/F 217 is an interface for transmitting image data from the camera 10 to the signal processing unit 20.

The interface unit 22, the recognition unit 23, and the detection unit 24 of the signal processing unit 20 described above with reference to FIG. 2 may be implemented either in hardware as a signal processing board (i.e., a signal processing circuit) or in software (program instructions) executed by the CPU 210 of the camera 10.

The program instructions to be executed by the detection device 100 (or, more specifically, the CPU 210) of the first embodiment may be provided as a computer program product recorded in a non-transitory computer-readable storage medium such as a CD-ROM, a memory card, a CD-R, or a DVD (digital versatile disk) as an installable file or an executable file.

The program instructions to be executed by the detection device 100 of the first embodiment may be configured to be stored in a computer connected to a network such as the Internet and provided by being downloaded via the network. The program instructions to be executed by the detection device 100 of the first embodiment may be configured to be provided via a network such as the Internet without being downloaded.

The program instructions of the detection device 100 of the first embodiment may be configured to be provided as being installed in the ROM 212 or the like in advance.

When the interface unit 22, the recognition unit 23, the detection unit 24, and the like are to be implemented in the program instructions executed by the detection device 100 of the first embodiment, the interface unit 22, the recognition unit 23, the detection unit 24, and the like may preferably be implemented on the RAM 211 by the CPU 210 by loading the program instructions from the ROM 212, the storage medium, or the like and executing the program instructions.

If acceleration data can be acquired from a network CAN (controller area network) mounted on the vehicle 200, the acceleration sensor 21 may be omitted from the signal processing unit 20.

As described above, in the detection device 100 of the first embodiment, the recognition unit 23 recognizes switching of signal indication of the traffic signal 300 from image data. The detection unit 24 detects a dangerous driving degree, which indicates a degree of danger of dangerous driving done by a driver of the vehicle 200, based on acceleration data of the vehicle 200 acquired after the signal indication is switched. The detection device 100 of the first embodiment can thus detect dangerous driving done by the driver when signal indication of the traffic signal 300 is switched.

Second Embodiment

The second embodiment is described below.

Figure 16:
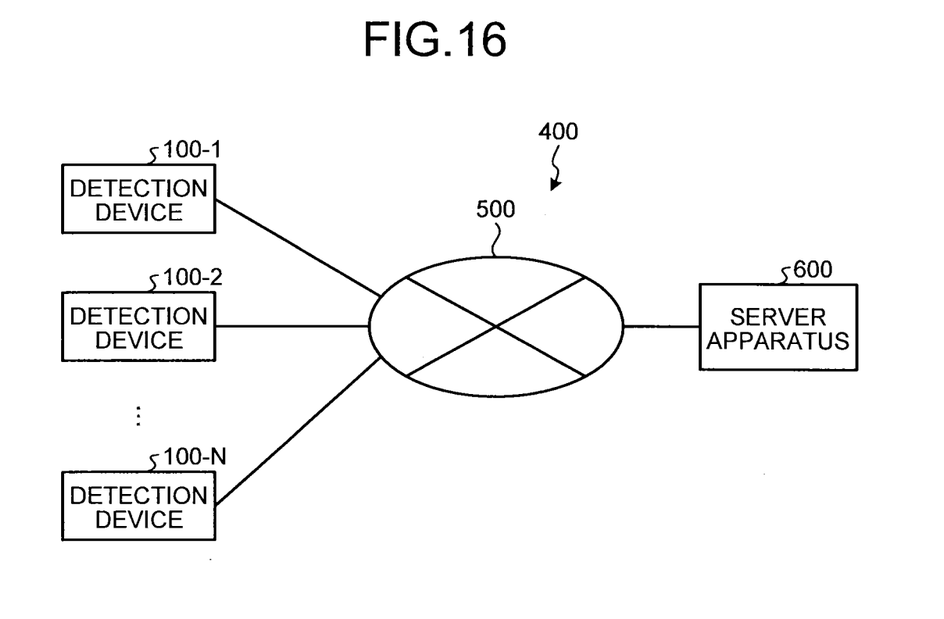
FIG. 16 is a diagram illustrating an example of a configuration of a detection system according to a second embodiment.

FIG. 16 is a diagram illustrating an example of a configuration of a detection system 400 according to the second embodiment. The detection system 400 of the second embodiment includes a detection device 100-1, a detection device 100-2, . . . , and a detection device 100-N (N is an integer greater than 0), and a server apparatus 600. The detection device 100-1, the detection device 100-2, . . . , and the detection device 100-N, and the server apparatus 600 are connected to each other via a network 500. The network 500 may be the Internet, for example. The detection device 100-1, the detection device 100-2, . . . , and the detection device 100-N are respectively mounted on a vehicle 200-1, a vehicle 200-2, . . . , and a vehicle 200-N, which are not illustrated in FIG. 16. Hereinafter, each of the detection device 100-1, the detection device 100-2, . . . , and the detection device 100-N is simply collectively referred to as the detection device 100.

The detection device 100 of the second embodiment is identical in configuration to that of the first embodiment (see FIG. 2). The communication unit 30 of the detection device 100 transmits, to the server apparatus 600, detection information, in which driver's dangerous driving degree detected using the method described in the first embodiment is associated with identification information, by which a transmission source is identified. The second embodiment is described on an assumption that the identification information, by which the transmission source is identified, is identification information of the driver.

Figure 17:
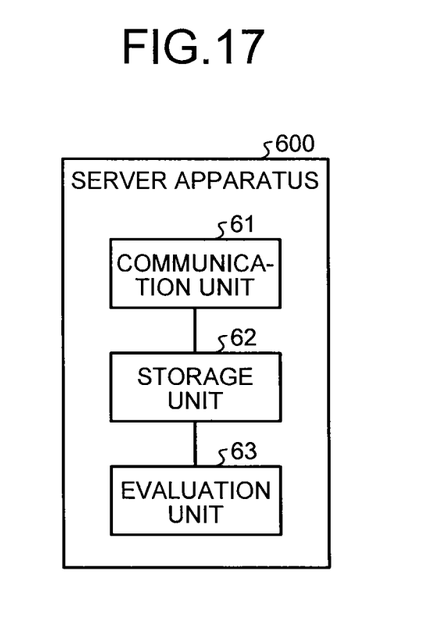
FIG. 17 is a diagram illustrating an example of a configuration of a server apparatus of the second embodiment.

FIG. 17 is a diagram illustrating an example of a configuration of the server apparatus 600 of the second embodiment. The server apparatus 600 of the second embodiment includes a communication unit 61, a storage unit 62, and an evaluation unit 63. Upon receiving the detection information from the detection device 100, the communication unit 61 stores the detection information in the storage unit 62. The evaluation unit 63 evaluates dangerous driving of the driver based on the detection information stored in the storage unit 62. In a situation where dangerous driving degree is defined, for example, as illustrated in FIG. 12, the evaluation unit 63 evaluates driver's dangerous driving using a sum of dangerous driving degrees or an average value of the driver's dangerous driving degrees (which is (the sum of the dangerous driving degrees)/(the number of detection information pieces each containing the identification information of the driver)) calculated for each of identification information pieces, by which each driver is identified. The larger the sum of the dangerous driving degrees or the average value of the driver's dangerous driving degrees, the more dangerous the driver's driving.

A hardware structure of the server apparatus 600 of the second embodiment is described below.

Figure 18:
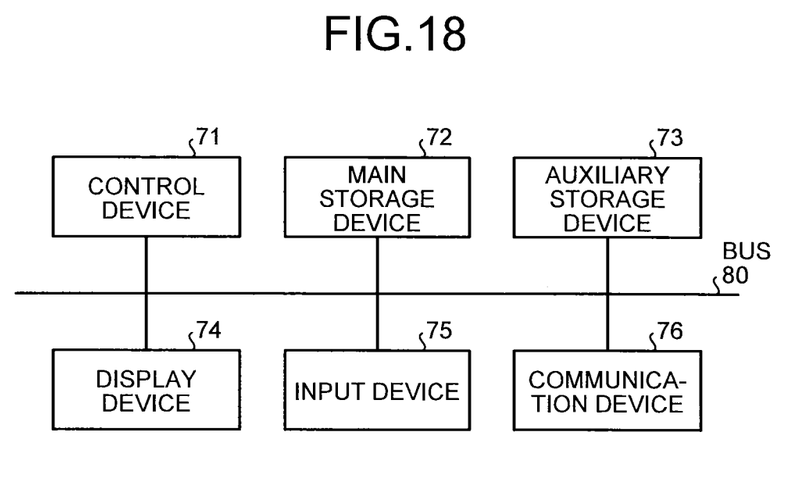
FIG. 18 is a diagram illustrating an example of a hardware structure of the server apparatus of the second embodiment.

FIG. 18 is a diagram illustrating an example of the hardware structure of the server apparatus 600 of the second embodiment. The server apparatus 600 of the second embodiment includes a control device 71, a main storage device 72, an auxiliary storage device 73, a display device 74, an input device 75, and a communication device 76. The control device 71, the main storage device 72, the auxiliary storage device 73, the display device 74, the input device 75, and the communication device 76 are connected to each other via a bus 80.

The control device 71 executes program instructions loaded from the auxiliary storage device 73 into the main storage device 72. The main storage device 72 is a memory such as a ROM or a RAM. The auxiliary storage device 73 is an HDD (hard disk drive), an optical drive, or the like. The storage unit 62 illustrated in FIG. 17 corresponds to the main storage device 72 and the auxiliary storage device 73.

The display device 74 displays a status of the server apparatus 600 and the like. The device 74 is an LCD, for example. The input device 75 is an interface for operating the server apparatus 600. The input device 75 is a keyboard, a mouse, and the like, for example. The communication device 7 is an interface for connecting to the network 500.

The program instructions to be executed in the server apparatus 600 of the second embodiment may be provided as a computer program product recorded in a non-transitory computer-readable storage medium such as a CD-ROM, a memory card, a CD-R, or a DVD as an installable file or an executable file.

The program instructions to be executed in the server apparatus 600 of the second embodiment may be configured to be stored in a computer connected to the network 500 such as the Internet and provided by being downloaded via the network. The program instructions to be executed in the server apparatus 600 of the second embodiment may be configured to be provided via the network 500 such as the Internet without being downloaded.

The program instructions of the server apparatus 600 of the second embodiment may be configured to be provided as being installed in the ROM of the main storage device 72 or the like in advance.

The program instructions to be executed in the server apparatus 600 of the second embodiment are configured in modules including the communication unit 61 and the evaluation unit 63 illustrated in FIG. 16 described above. The communication unit 61 and the evaluation unit 63 are loaded into the main storage device 72 by the control device 71 by reading out the program instructions from the storage medium and executing the program instructions. Hence, the communication unit 61 and the evaluation unit 63 are generated on the main storage device 72. A part or all of the communication unit 61 and the evaluation unit 63 illustrated in FIG. 16 may be implemented in hardware such as an IC rather than in software.

As described above, in the detection system 400 of the second embodiment, the recognition unit 23 recognizes switching of signal indication of the traffic signal 300 from image data. The detection unit 24 detects a dangerous driving degree done by a driver of the vehicle 200 based on acceleration data of the vehicle 200 acquired after the signal indication is switched. The evaluation unit 63 evaluates driving of the driver based on the driver's dangerous driving degree stored in the storage unit 62.

The detection system 400 of the second embodiment can thus evaluate driver's driving based on the driver's dangerous driving degree detected by the detection device 100. A result of the evaluation of the driver' driving obtained by the detection system 400 of the second embodiment can be utilized in calculation of automobile-insurance fee of the driver and the like.

The recognition unit 23, the detection unit 24, the storage unit 62, and the evaluation unit 63 of the detection system 400 may be implemented on either the detection device 100 or the server apparatus 600. For example, the storage unit 62 and the evaluation unit 63 may be implemented on the detection device 100.

According to an aspect of the present invention, it is possible to detect dangerous driving done by a driver when signal indication of a traffic signal is switched.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection device comprising:
   a camera configured to acquire image data obtained by capturing surroundings of a vehicle; and
   processing circuitry configured to
      recognize switching of signal indication of a traffic signal from the image data; and
      start to detect a dangerous driving degree indicating a degree of dangerous driving done by a driver of the vehicle after the signal indication is switched based on acceleration data of the vehicle acquired after the signal indication is switched.

2. The detection device according to claim 1, wherein the dangerous driving degree is determined depending on a duration of time between when the signal indication is switched and when the acceleration data exceeds a first threshold.

3. The detection device according to claim 1, further comprising an acceleration sensor configured to acquire the acceleration data of the vehicle.

4. The detection device according to claim 1, wherein the processing circuitry is further configured to transmit the detected dangerous driving degree to a server apparatus that is configured to evaluate driving of the driver.

5. The detection device according to claim 1, wherein the camera acquires the image data in (R,G,B) color space, and the processing circuitry converts the image data in the (R,G,B) color space into image data in (Y,U,V) color space and extracts a signal pixel region representing signal indication from the image data in the (Y,U,V) color space based on the image data in (Y,U,V) color space and (U,V) distributions of signal pixels representing signal indication which is obtained in advance.

6. The detection device according to claim 5, wherein the processing circuitry expands the signal pixel region into an expanded pixel region by covering each pixel in the signal pixel region with a plurality of pixels and recognizes a circular pixel region included in the expanded pixel region as a shape of the signal indication of the traffic signal.

7. The detection device according to claim 1, wherein when the detected dangerous driving degree is higher than a second threshold, the processing circuitry alerts the driver of the vehicle that the driver is performing dangerous driving.

8. A detection system comprising:
   a camera configured to acquire image data obtained by capturing surroundings of a vehicle; and
   processing circuitry configured to
      recognize switching of signal indication of a traffic signal from the image data;
      start to detect a dangerous driving degree indicating a degree of dangerous driving done by a driver of the vehicle after the signal indication is switched based on acceleration data of the vehicle acquired after the signal indication is switched;
      store, in a memory, therein the dangerous driving degree of the driver; and
      evaluate driving of the driver based on the dangerous driving degree of the driver stored in the memory.

9. A detection method, implemented by a detection device, comprising:
   acquiring, by a camera, image data obtained by capturing surroundings of a vehicle;
   recognizing, by processing circuitry of the detection device, switching of signal indication of a traffic signal from the image data; and
   start detecting, by the processing circuitry, a dangerous driving degree indicating a degree of dangerous driving done by a driver of the vehicle after the signal indication is switched based on acceleration data of the vehicle acquired after the signal indication is switched.

* * * * *